Dec. 14, 1943.  A. F. CHOUINARD  2,336,596
TORCH CUTTING MACHINE
Filed Feb. 8, 1941  2 Sheets-Sheet 1
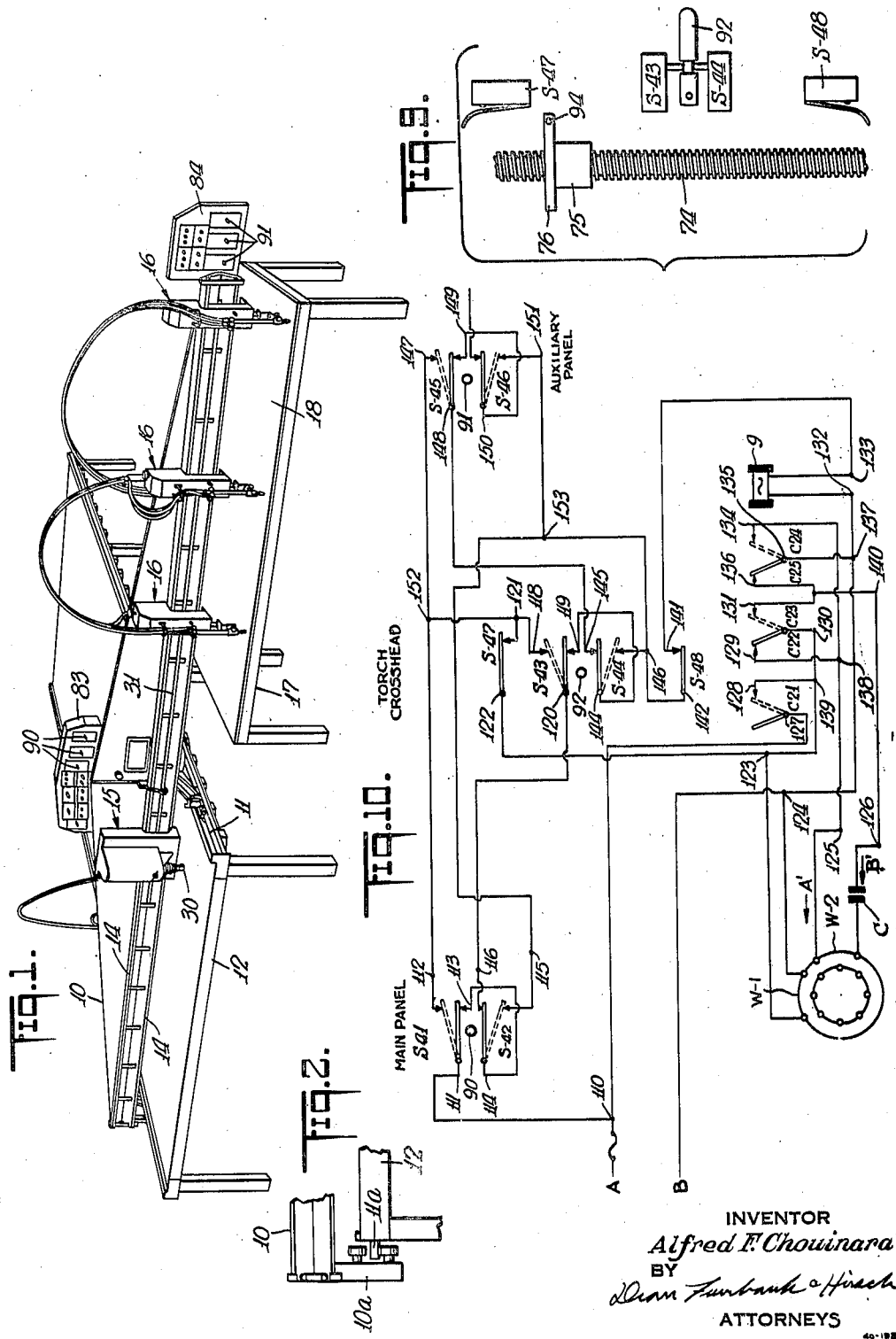
INVENTOR
Alfred F. Chouinard
BY
ATTORNEYS Dec. 14, 1943.　　A. F. CHOUINARD　　2,336,596
TORCH CUTTING MACHINE
Filed Feb. 8, 1941　　2 Sheets-Sheet 2
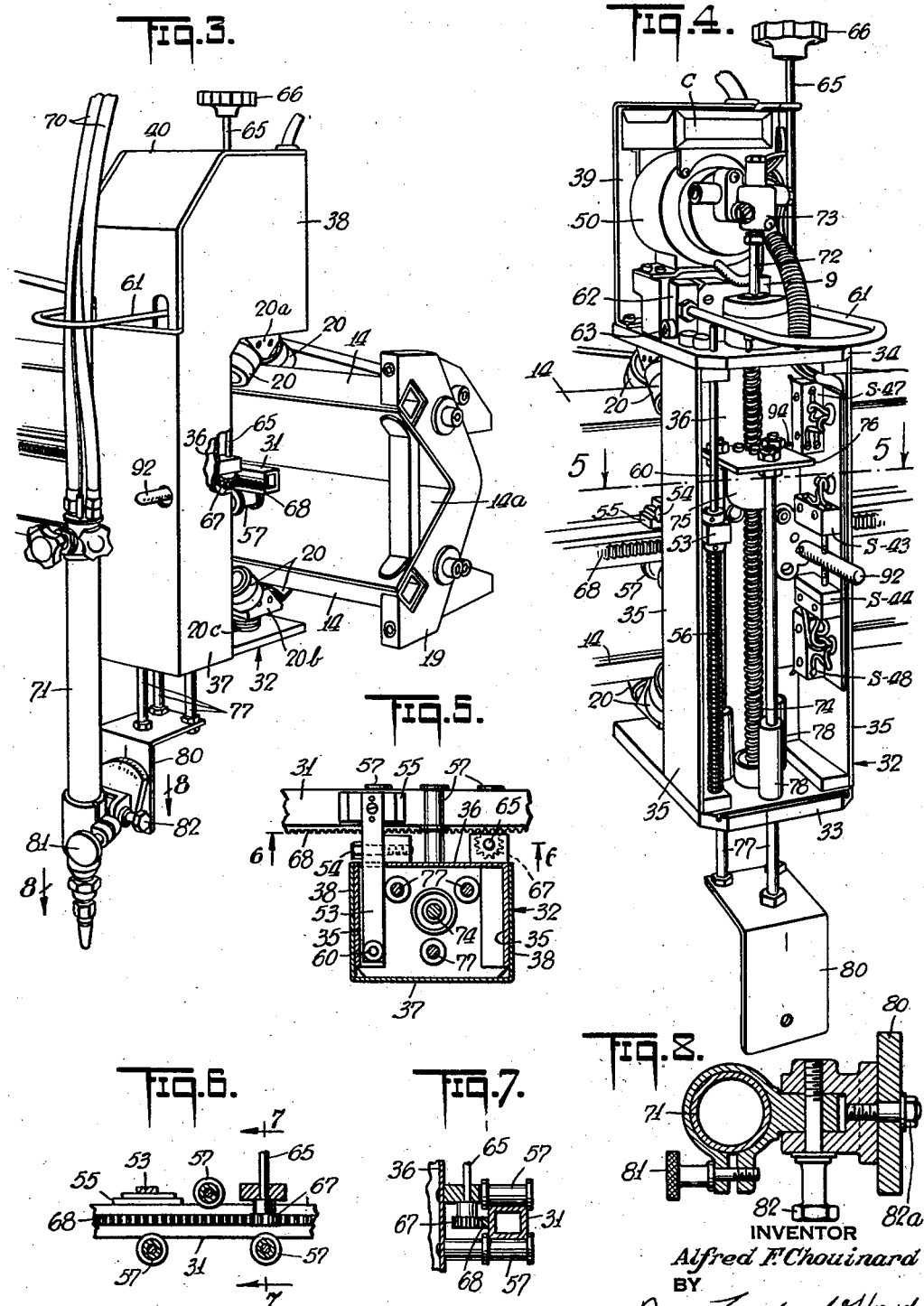
INVENTOR
Alfred F. Chouinard
BY
Dean Fairbank & Hirsch
ATTORNEYS Patented Dec. 14, 1943

2,336,596

UNITED STATES PATENT OFFICE 2,336,596

TORCH CUTTING MACHINE

Alfred F. Chouinard, Chicago, Ill., assignor to National Cylinder Gas Company, Chicago, Ill., a corporation of Delaware Application February 8, 1941, Serial No. 378,102

25 Claims. (Cl. 266—23)

The present invention relates to that general type of metal cutting machine of the torch type, in which the movement of the torch over the metal part being cut is in accordance with the movement of a tracer wheel, pointer, spot light or the like, which follows a templet, the lines on a drawing, a pattern or other guide.

One object of the present invention is to provide new and improved means for supporting the torch and effecting and facilitating its adjustment with respect to the part to be cut, and its movement over said part.

Another object is to provide improved means for effecting quick rough adjustment of a torch with respect to its carrier by a simple manipulation, and for effecting more exact adjustment after the rough adjustments have been made.

Another object is to provide improved means by which the spacing of the torch with respect to the plate, sheet or other part to be cut can be quickly and easily adjusted.

The necessity for raising and lowering a torch arises from the fact that the torch support is ordinarily at a fixed distance from the floor and the part to be cut may be part of an apparatus previously assembled and resting on the floor, or may be a heavy part which is placed on blocks or other supports on the floor or may be a plate of any desired thickness resting on a support of fixed elevation, or may have portions at different elevations and over which the torch is to move.

Another object is to permit spacing and securing of any desired cross head in any desired position with respect to any other cross head of the machine and the spacing of the group of cross heads as desired in respect to the drive unit.

Another object is to provide means for adjusting the elevation of the torch selectively from a plurality of control stations dominating each other in predetermined sequences, whereby simultaneous operation of the controls from different stations will effect torch adjustment only from the dominating station.

Another object is to provide a safety means for preventing the overrun of the torch beyond predetermined levels during the elevational adjustment thereof.

Another object is to provide a compact self-contained torch cross head unit supported on the carriage for movement therealong, and motor driven means for elevational adjustment of the torch selectively in either direction.

Another object is to provide a cutting machine of the general type referred to, in which a plurality of torches on a single carriage are movable therewith and independently adjustable with respect thereto and with respect to the carriage driving means.

Various other objects, features and advantages of the invention will be apparent from the following particular description, and from an inspection of the accompanying drawings, in which:

Fig. 1 is a perspective view showing a torch cutting machine embodying the present invention.

Fig. 2 is a front elevation of one end portion of the carriage and table.

Fig. 3 is a perspective view showing the other end portion of the carriage with a torch cross head unit supported thereon, and on a larger scale.

Fig. 4 is a perspective view showing one torch cross head unit with part of its casing removed to reveal the interior thereof.

Fig. 5 is a horizontal cross-section through a cross head unit, and showing its connections to the means for moving it along the carriage, said section being taken on the line 5—5 of Fig. 4.

Fig. 6 is a vertical section on the line 6—6 of of Fig. 5.

Fig. 7 is a vertical section on the line 7—7 of Fig. 6.

Fig. 8 is a horizontal section on the line 8—8 of Fig. 3.

Fig. 9 is a somewhat diagrammatic view of the switches in the cross head and the operating parts therefor, and Fig. 10 is a wiring diagram for a plurality of control stations for controlling the operation of the motor by which elevational adjustments of the corresponding torch can be made.

In the specific embodiment of the invention shown in the drawings, the cutting apparatus includes a carriage 10, which travels horizontally over a horizontal table 12 on which may be supported a templet, drawing, pattern or other guide. As the carriage has a cantilever projection beyond the table, one track or rail 11 which is intermediate of the ends of the carriage, faces upwardly at one edge of the table while the other track or rail 11a which is below the end of the carriage is engaged by upper and lower rollers on a depending portion 10a of the carriage as shown in Fig. 2.

The carriage is provided with a beam having parallel superposed rails 14 extending at right angles to the rails 11, 11a for supporting a tracing mechanism 15, and a plurality of spaced torch cross head units 16 and guiding them along the carriage in a horizontal direction at right angles to the direction of movement of said carriage. These cross head units 16, three of which are shown, travel in unison over the metal to be cut for simultaneous forming of a plurality of units from one or more metal sheets or other workpieces 18 resting on a table 17 or any other support. Each cross head may be provided with two superposed pairs of guide rollers 20, the rollers of each pair being angularly mounted for rolling contact with the V-shaped faces of the rails 14. Each upper pair of rollers may be mounted in brackets 20a rigid with the cross head frame while each lower pair may be mounted in a bracket 20b pressed upwardly by a spring 20c to allow for any inaccuracy in the manufacture of the beam and its rails 14.

These rails 14 are held in vertically spaced relationship in any suitable manner as for instance by a frame plate 14a of angular cross-section, having its V-shaped concave side facing the forward side of the carriage to permit the cross heads 16 to be supported close to the vertical plane of said rails as shown. A stop plate 19 connected to the free end of the carriage prevents accidental slipping of the end cross head 16 off the end of the rails 14, and may be removable to permit the cross heads 16 to be rolled off or on to said rails.

The tracing mechanism 15 may be of a well known type, or may be of the form shown and claimed in companion application Serial No. 395,616, filed May 28, 1941, or as shown diagrammatically in the Mott Patent 2,269,636, issued January 13, 1942. It has a tracing element 30 in the form of a tracer wheel, pointer, spot light or the like, which is steered along the outline of the pattern or other guide to be copied or traced and may be driven by a motor so that it acts as a traction wheel to move the carriage and the torches on the carriage.

The movement of this tracing element 30 with respect to the carriage 10 is transmitted to the torch cross head units 16 through a connecting piece 31 shown in the form of a bar of rectangular cross-section, extending between and parallel to the rails 14. This bar 31 is detachably secured to the tracing mechanism 15, and is releasably clutched to said cross head units 16 in a manner to be described. With this construction the actual movement of the tracing element 30 resulting from the movement of the carriage 10 along the rails 11, 11a and the crosswise movement of the tracing mechanism 15 along the rails 14 is duplicated by each of the cross head units 16.

Each of the torch cross head units 16 includes a frame structure shown in the form of a boxlike casing 32 with open front, a bottom wall 33, a top wall 34, a pair of side walls 35 and a rear wall 36. These bottom and top walls may extend rearwardly and carry the brackets 20a and 20b which support the rollers 20 engaging the rails 14. An outer removable casing or cover 37, U-shaped in cross-section is telescopically fitted around the casing 32 to close the open front thereof as shown in Figs. 3 and 5 and to complete a housing for the cross head adjusting mechanism to be described. This outer casing 37 has side sections 38 extending above the frame wall 34, and top wall 40 coacting with a rear wall plate 39, secured to the rear of the top wall 34, to complete the housing for the torch adjusting motor 50, and other operating parts.

As a feature of the present invention, the means for connecting each of the cross head units 16 to the bar 31 includes a clutch or brake bar 53, which is pivotally supported on a pin or bolt 54 secured to the rear frame wall 36. A friction lined clutch or brake shoe 55 is secured to the rear end and outside of the casing while the front end extends through the wall 36 into the interior of the frame casing. A vertical plunger 60 is slidably mounted in the top and bottom walls 34 and 33 of the casing and has a pair of collars between which the front end of the bar 53 extends. A coil spring 56 encircles the plunger 60 below the lower collar and acts upwardly against the forward end of the bar 53 to normally press the clutch shoe 55 into frictional clutch engagement with the upper face of the bar 31. Three flanged rollers 57 rotatably supported on the rear frame wall 36 engage the upper and under sides of the bar 31 to form a support for the latter as shown in Figs. 6 and 7.

An operating handle 61 shown in the form of a bail or U-shaped bar extends forwardly from the casing, and has its ends secured to blocks 62, pivotally supported at 63. One side arm of this handle 61 is directly above the projecting end of the plunger 60, as shown in Fig. 4, so that upon a depressing movement of the handle 61 the plunger is pushed down, the spring 56 is compressed and the clutch bar 53 is swung about its pivotal support 54 to lift the clutch shoe 55 from the bar 31.

The spring is normally under such compression that it holds up the plunger 60 and handle 61 and applies sufficient pressure to the brake shoe to clamp the torch head casing to the bar 31.

To effect adjustment in the position of a cross head unit 16 with respect to the other cross head units or with respect to the tracing mechanism 15 and the carriage driving mechanism, the operator firmly grasps the handle 61 and presses down on it to release the clutch, and then moves the handle horizontally to push the cross head unit 16 along the bar 31 and the rails 14. When the handle 61 is released, the spring 56 restores the clutch shoe 55 into clutching engagement with the bar 31, so that the cross head unit will be secured in adjusted position on said bar and will move therewith upon lengthwise movement thereof.

As a feature of the present invention, means are provided to effect exact adjustment of the cross head unit with respect to the bar 31 after the comparatively rough speedy adjustment above described has been made. For that purpose, there is provided a vertically extending spindle 65, terminating at its upper end in a handle 66 above the cross head casing. At its lower end, the spindle 65 carries a pinion 67 meshing with rack teeth 68 on the front vertical face of the bar 31. By turning the handle 66, the unit 16 can be forced along the bar 31 into the desired exact position, even though the clutch shoe 55 is in clutched position.

As a feature of the present invention, the handle 61 projecting forwardly beyond the front face of the casing forms a loop for holding in place and guiding the hose 70 leading to the torch 71. This guide is spaced above the uppermost end of the torch so that as the torch is raised or lowered the hose slide vertically through the guide and are kept from falling to one side and exerting a force tending to shift the position of the torch or torch holder and change the direction of the cut.

As another feature of the present invention, means are provided for effecting elevational adjustment of the torch 71 with respect to the carriage 10, so that the torch tip may be adjusted to any elevational position with respect to the workpiece 13. For that purpose a vertical shaft 72 is driven from motor 50 through a suitable reduction gear unit 73, and is secured to a suitably journalled lead screw 74 extending vertically in the frame casing 32. Threaded on this lead screw 74 is a lead nut 75 to which is connected a plate 76. Rigid with this plate 76 are three guide rods 77, slidably passing through respective guide sleeves 78 fixed to the bottom frame wall 33, and projecting downwardly from said plate. Connected to the lower ends of these guide rods 77 is an angle bracket 80, having a horizontal flange connected to said guide rods, and a vertical flange to which the torch 71 may be secured in any desired adjusted position. The torch may be vertically adjusted with respect to the bracket 80 and clamped by a screw 81, and may be angularly adjusted in one plane and clamped by a screw 82 and may also be angularly adjusted in another plane and clamped in the other direction by screw 82a, as shown particularly in Fig. 8.

When the motor 50 is driven, the lead screw 74 is turned to move the nut 75 therealong with the guide rods 77 endwise, so that the torch 71 is adjusted up or down as desired. The lead screw 74 and lead nut 75 form self-locking means by which downward slippage of the torch 71 from the desired elevational adjusted position is prevented when the motor is de-energized.

As one important feature of the invention, the motor is of the reversible type and a switching device is provided so that the operator instinctively moves the switch controlling member in proper direction whenever he wishes to raise or lower the torch. More particularly the switching device is so designed that when the operator wishes to lower the torch, he lowers the switch handle, and when he wishes to raise the torch, he raises the switch handle. When he releases the switch handle it automatically moves to an intermediate position in which both circuits are open and the motor stops.

As shown, a switch lever 92 has one end pivotally mounted in the casing and its free end extending out through a hole or slot in the cover 37. The lever is normally held in a horizontal position by the spring action of the motor circuit switches S—43 and S—44 disposed above and below the lever 92 respectively. By slightly lifting the outer end of the switch lever 92, the switch S—43 closes one circuit of the motor 50 to run the motor in one direction and raise the torch. By slightly depressing the outer end of the switch lever 92, the switch S—44 closes the other circuit of the motor and the motor runs in the opposite direction to lower the torch. The switch lever may be held, raised or depressed as long as desired to give the required movement of the torch, and the motor will stop when the switch is released. If only a slight movement of the torch is required, a mere tapping of the switch lever with almost instantaneous release may be sufficient.

To prevent accidental jamming of the parts and stalling of the motor when the nut 75 reaches the upper or lower limit of its movement, there are provided limit switches S—47 and S—48 which are operated by the nut 75 or associated parts, as indicated somewhat diagrammatically in Fig. 9. These switches are normally closed but one or the other is opened to break the circuits and stop the motor if either switch S—43 or switch S—44 is held closed for too long a time.

As a further feature of the present invention, the operation of the motors 50 by which the raising or lowering of the several torches 71 is effected, can be controlled from either one of a plurality of control stations. All of the motors may be controlled from a main control panel 83 adjacent to the tracing mechanism 15 and secured to the carriage 10, or from an auxiliary control panel 84 fixed to the free end of said carriage, and the motor of each individual cross head unit 16 can be controlled by its own switch lever as above described.

As a further feature, these controls dominate each other in predetermined sequence. For instance, the main station 83 dominates all the other controls, and the individual controls at the cross head units 16 dominate the control station 84. In this manner, if for instance three persons should simultaneously but differently operate the controls from the stations 83 and 84 and from the individual cross head units 16, the position of the control at the station 83 would determine the adjusting movement of the cross head units 16. Likewise, if the controls at stations 84 and at the cross head units should be operated simultaneously, but differently, the position of the control at the cross head units would determine the adjusting operation of said units.

The wiring diagram in Fig. 10 shows one way in which one of the individual cross head motors 50 can be selectively controlled from a plurality of control stations. Similar wiring would be employed for each cross head motor.

If the carriage is provided with three cross head units the main control panel 83 has three pairs of switches, one pair for each motor; the auxiliary control panel also has three pairs of switches, one for each motor; and each cross head has a pair of switches for its own motor. The two switches of each pair are arranged in superposed relationship and each pair has a single vertically movable operating handle. On the main control panel, each upper switch S—41 controls the raising of the corresponding torch 71, and each lower switch S—42 controls the lowering of said torch. Each pair has a single lever 90. On the auxiliary control panel 84, each pair S—45 and S—46 is arranged in similar superposed relationship, and with a single lever 91 therebetween. Each cross head unit 16 has a single pair of superposed switches S—43 and S—44 with the lever 92 therebetween.

Each of the motors 50 is of the reversible type, and its direction of rotation is controlled from the switch levers 90, 91 and 92 according to whether they are pushed up or down from normal position. Each motor 50 may be of the single phase reversing type with two field windings W—1 and W—2, with a condenser C in series with winding W—2.

The current to the system is supplied by the mains A and B. A relay includes an electromagnetic coil 9, and contacts C—21, C—22, C—23, C—24, and C—25. These contacts are operated mechanically by the armature of the said relay, which armature action is controlled by the magnetic force of the relay coil 9 so that the current flow is as will be later described.

The illustrated diagram is for only one motor. In this wiring the switches S—43, S—44, S—47 and S—48, the motor 50, the relay coil 9 and the contacts C—21, C—22, C—23, C—24 and C—25 are located in the cross head unit; the switches S—41 and S—42 are located on the main panel 83 and the switches S—45 and S—46 are located on the auxiliary panel 84. The blades of the various switches and of the relay contacts are shown in solid lines in normal position with the motor at rest and the coil of the relay de-energized. They may be moved to the dotted line position to control the circuit as will be explained.

To raise any torch 71 from the main control panel 83, the corresponding lever 90 is raised to move the contact blade of its upper switch S—41 into upper dotted position, so that the current flows from main A to point 110, to point 111, through switch S—41 to point 112, to point 152, to point 121, through switch S—47 to point 122 and point 123. From this point 123 the current divides and follows parallel paths. One branch of this parallel circuit continues from point 123, through winding W—1 to point 124, and returns to main B. The other parallel branch continues from point 123, to points 139 and 130, through contact C—22, to points 129, 138 and 125, through winding W—2 in the direction indicated by arrow A', to points 126, 140 and 136, through contact C—25 to points 135, 137 and 124, and to the main B. The motor 50 is thereby driven in a direction determined by the direction of current flow in the windings W—2, and the lead screw 74 rotated in a corresponding direction to raise the nut 75, and the torch 71. When the torch 71 reaches the desired elevation, the lever 90 is released and will automatically return to neutral position and the circuit restored to the open neutral position indicated in full lines, so that the motor 50 is stopped.

To raise the torch 71 from the auxiliary control panel 84, the lever 91 on said panel corresponding to the torch to be raised is lifted to move the contact blade of the upper switch S—45 in the dotted position shown. Under these conditions, the current flows from main A to points 110 and 111, through switch S—41 to points 113 and 114, through switch S—42 to points 116 and 120, through switch S—43 to points 119 and 144, through switch S—44 to points 145 and 148, through switch S—45 in its dotted position, to points 147, 152 and 121, and through switch S—47 to points 122 and 123. From this point 123 the current travels in the same direction as was described previously.

To raise the torch from the control on its respective cross head, the lever 92 is raised to move the contact blade of the upper switch S—43. In this position the current flows from main A to points 110 and 111, through switch S—41 to points 113 and 114, through switch S—42 to points 116 and 120, through switch S—43 in its dotted position to points 118 and 121, and through switch S—47 to points 122 and 123. From this point 123 the current travel is the same as was described previously.

It is seen that in all cases the torch raising current starts at main A and always arrives at point 123, where it is divided through parallel branches until it eventually reaches main B.

If the nut 75 reaches its upper limit before the control operated lever 90, 91 or 92 is released, the pin 94 on said nut will lift the contact blade of the safety switch S—47 to open the circuit of the motor windings W—1 and W—2 and thereby stop the motor 50. The contact blade of the safety switch S—47 is in the form of a spring blade or is otherwise spring-pressed to automatically close said switch when the nut 75 is lowered.

To lower any torch 71 from the main control panel 83, the corresponding lever 90 is lowered to move the contact blade of the respective lower switch S—42. In this lowered position of the lever 90, the current flows from main A to points 110 and 111, through switch S—41 to points 113 and 114, through switch S—42 in dotted position to points 115, 153, 146 and 142, through switch S—48 to points 141 and 133, through relay coil 9 to points 132, 137 and 124 and to main B. This actuation of switch S—42 energizes relay coil 9 and causes the contact blades of the relay switches to be shifted into the dotted line position shown, so that contacts C—22 and C—25 are opened, and contacts C—21, C—23 and C—24 are closed. The two pairs of contacts C—22 and C—23, and C—24 and C—25 serve as reversing contacts to determine the direction of rotation of the corresponding cross head motor 50, and consequently the direction of elevational movement of the corresponding torch. Contact C—21 functions as a power contact to supply current to the windings W—1 and W—2 when relay coil 9 is energized. With contact C—21 closed in the dotted line position shown, the current flows from main A to points 110 and 127, through contact C—21 in dotted line position and to point 139. From point 139 the current travels along parallel paths to main B. One branch of this parallel circuit is from point 139 to point 123, through the motor winding W—1 to point 124 and then to main B. The other branch of this parallel circuit is from point 139 to point 130 through contact C—23 in the dotted line position, to points 131, 140 and 126, through the field winding W—2 in the direction indicated by the arrow B' to points 125, 138 and 134, through contact C—24 in the dotted line position, to points 135, 137 and 124, and then to main B. From an inspection of of the wiring diagram it will be seen that the current flow through the field winding W—1 is always in the same direction. The current flow through the field winding W—2 changes, depending upon whether it is desired to have the torch raised or lowered.

To lower any torch 71 from auxiliary control panel 84, the corresponding lever 91 is lowered to move the contact blade of the respective switch S—46 into dotted line position shown. In this lowered position of the lever 91, the current flows from main A to points 110 and 111, through switch S—41 to points 113 and 114, through switch S—42 to points 116 and 120, through switch S—43 to points 119 and 144, through switch S—44 to points 145 and 148, through switch S—45 to points 149 and 150, through switch S—46 in dotted line position to points 151, 153, 146 and 142, and through switch S—48 to point 141. From here the current flows to the point 133 in the same manner as described in connection with the torch lowering actuation of switch S—42.

To lower the torch from the control on its respective cross head, the corresponding lever 92 is lowered to move the contact blade of the lower switch S—44 so that the current flows from main A to points 110 and 111, through switch S—41 to points 113 and 114, through switch S—42 to points 116 and 120, through switch S—43 to points 119 and 144, through switch S—44 in lowered position to points 146 and 142, and through switch S—48 to point 141. From here the current flows to the coil 9 in the same manner as described for the torch lowering actuating switch S—42.

If the nut 75 reached its lower limit before the operated control lever 90, 91 or 92 is released, the pin 94 on said nut will push down the contact blade of the safety switch S—48 to stop the motor 50. The contact blade of this safety switch S—48 is spring-pressed as in the switch S—47 so as to automatically close said switch S—48 upon the raising of the nut 75.

The circuit shown affords dominating priority of the various control switches at the levers 90, 91 and 92 in predetermined sequence corresponding to the numbering of the switches. For instance, switch S—44 takes precedence over switches S—45 and S—46, so that operation of this switch S—44 determines the operation of the corresponding motor 50, irrespective of the operation of switches S—45 and S—46. Similarly switch S—43 takes precedence over switches S—44, S—45 and S—46. This arrangement prevents the motor 50 from being connected to the circuit in a manner tending to operate said motor in both directions.

The number of circuits similar to that shown corresponds to the number of cross head units. The switch levers 90 and 91 and 92 on the main control panel 83, on the auxiliary control panel 84 and on the torch cross head 16 are desirably keyed in color to provide a quick means of control identification. For instance, the control switch levers on the control panels 83 and 84 and on the respective torch cross head unit 16 may be green for the first torch, yellow for the second, and white for the third.

All of the circuits for the corresponding cross head units 16 are connected to a junction box (not shown) mounted on the rear side of the carriage 10. This junction box contains more than the standard number of electrical sockets to accommodate the electrical plugs from each cross head unit so that addition of extra cross head units may be readily made at any time, and any cross head unit may be readily and simply disconnected electrically for replacement or servicing of any part thereof. The plug and socket attachments at the junction position may be equipped with polarity guide pins to prevent the plugs from improper insertion into the sockets.

As many changes could be made in the above apparatus, and many apparently widely different embodiments of this invention could be made without departing from the scope of the claims, it is intended that all matter contained in the above description or shown in the accompanying drawings shall be interpreted as illustrative and not in a limiting sense.

What is claimed is:

1. In a cutting machine, the combination comprising a carriage, a tracing device and a cutting torch independently mounted on said carriage and movable along the latter, a bar connecting said tracing device and said torch independent of said carriage, a releasable friction clutch connecting said bar and said torch, and means engaging said bar for moving said torch along said bar against the frictional action of said clutch.

2. In a cutting machine, the combination comprising a carriage, a tracing device and a cutting torch independently mounted on said carriage and movable along the latter, a rack bar movable endwise on said carriage and connecting said tracing device and said torch, a releasable friction clutch connecting said bar and said torch, and a pinion engaging said rack bar for moving said torch along said bar independently of the action of said clutch.

3. In a cutting machine, the combination comprising a carriage having a guideway thereon and extending in a direction at right angles to the direction of movement of said carriage, a tracing device and a cutting torch support independently mounted on said guideway, a rack bar connected to said tracing device and movable endwise in a direction parallel to said guideway, a friction clutch member carried by said torch support and engaging said bar to effect movement of the torch support with the bar, and a pinion carried by said torch support and meshing with the teeth on said rack bar for moving said torch in respect to said bar.

4. In a cutting machine, the combination comprising a carriage, a tracing device and a cutting torch independently supported on said carriage, a friction clutch for securing said torch in selective position with respect to said tracing device, a handle pivoted to swing in a vertical plane for releasing said clutch and held against horizontal movement in respect to the torch for effecting movement of said torch with respect to said tracing device when the clutch is released, and means for positively moving said torch toward and from said tracing device when said clutch is engaged.

5. In a cutting machine, the combination comprising a carriage, a tracing device and a cutting torch supported on said carriage, a clutch for securing said torch in selective position with respect to said tracing device, and a handle for releasing said clutch and for effecting movement of said torch with respect to said tracing device when the clutch is released, said handle being in the form of a U-shaped bail serving as a support for the hose leading to said torch.

6. In a cutting machine, the combination of a tracing device and a cutting torch supported for universal movement in unison, an electric motor for raising or lowering said torch, a manually operable circuit control member for said motor, means operable when said control member is moved in one direction for raising said torch and when moved in the opposite direction for lowering said torch independently of said tracing device, and means for automatically restoring said control member to neutral position when said control member is manually released to stop further elevational movement of said torch.

7. In a cutting machine, the combination of a tracing device, a cutting torch adapted to operate over a workpiece to be cut, said device and said torch being supported for universal movement in unison, a reversible electric motor operatively connected for raising or lowering said torch in respect to said workpiece independently of said tracing device, and a plurality of manual controls at spaced stations for effecting operation and determining the direction of rotation of said motor.

8. In a cutting machine, the combination of a tracing device, a cutting torch, said device and said torch being supported for universal movement in unison, a reversible electric motor operatively connected to said torch for effecting the desired spacing of the torch from the piece to be cut independently of said tracing device, a manually operable motor current reversing switch adjacent to said tracing device, a manually operable motor current reversing switch adjacent to said torch and means preventing effective operation of one of said switches during operation of the other of said switches.

9. In a cutting machine, the combination of a carriage, a tracing device, a plurality of cutting torches, said device and said torches being supported on said carriage in normally fixed relative positions and connected for movement in unison crosswise of the direction of movement of said carriage, a plurality of manually operable control members mounted at a station remote from said torches and corresponding to respective torches, and a plurality of means each responsive to the operation of the corresponding one of said control members for selectively adjusting the position of the corresponding torch independently of each other and of said tracing device.

10. In a cutting machine, the combination of a plurality of cutting torches, means interconnecting said torches for movement in unison over a working surface, a plurality of manually operable control members mounted at a station remote from said torches and corresponding to respective torches, a control member mounted near each individual torch, and a plurality of means each responsive to the operation of the corresponding one of said control members for selectively adjusting the distance of the corresponding torch from said surface independently of each other.

11. A cutting machine including a carriage, a cutting torch mounted thereon, an electric motor for raising or lowering said torch to effect the desired spacing from the part to be cut, a plurality of manually operable motor circuit controlling switches and means for rendering one of said switches ineffective during operation of another one of said switches, one of said switches being disposed adjacent to said torch and another being located at a remote point.

12. In a cutting machine, the combination of a cutting torch, means for moving said torch over a working surface, manually controlled motor driven means for selectively moving said torch towards or away from said working surface at will, and safety means automatically operable when said torch reaches either one or two extreme positions with respect to said plane for interrupting said motor driven means whereby further adjusting movement of said torch beyond the extreme position reached is safely prevented.

13. In a cutting machine, the combination comprising a carriage movable back and forth horizontally in one direction, a pair of parallel superposed rails secured to said carriage and extending crosswise of the direction of movement of said carriage, a frame plate connected to and between said rails to form a rigid unit with said rails, and having a concave cross-section, a plurality of torch supports on the concave side of said plate, each having rollers movable along said rails, a tracing device supported on said rails, and a bar extending between and parallel to said rails on the concave side of said plate, and connected to said tracing device and to said torch supports for transmitting the movement of said tracing device to said torch supports.

14. In a cutting machine, the combination of a tracked carriage movable horizontally in one direction, a tracing device and a cutting torch independently supported on said carriage for movement in unison in a direction crosswise of the movement of said carriage, means for adjusting said tracing device and torch towards and from each other on said carriage, and means for vertically spacing the torch in selective position with respect to the work to be cut, and independently of said tracing device, and including an electric motor on said carriage movable therealong with said torch in said crosswise direction, and manually operable switch means for controlling said motor, whereby said motor may be started at will to effect vertical adjusting movement of said torch, and may be stopped at will when the desired vertical adjustment of said torch has been made.

15. In a cutting machine, the combination of a connecting piece supported for universal movement, a tracing device and crosshead frame secured in normally fixed relative position to said connecting piece for movement in unison, but adjustable towards and away from each other along said connecting piece, a cutting torch mounted on said frame and adapted to move therewith over a workpiece to be cut, an electric motor mounted on said frame, a transmission between said motor and said torch for adjusting the spacing of said torch from said workpiece upon operation of said motor independently of said tracing device, and including a lead screw, a lead nut on said screw, and means connecting said torch to said nut and guided in said frame, a manually operable motor control member for stopping and starting said motor at will, and means operable in accordance with the direction of movement of said control member for predetermining the direction of rotation of said lead screw.

16. In a cutting machine, the combination comprising a pair of horizontal parallel tracks, a carriage spanned across said tracks, and having a cantilever projection beyond one of said tracks, said carriage being supported on said latter track for movement therealong, and having a roller adapted to engage the underside of the other track, and to exert an upward force on said latter track resisting tilting of said carriage resulting from the loading of said carriage projection, vertically spaced horizontal rails carried by said carriage substantially at right angles to said tracks, a tracing mechanism supported on said rails between said tracks, a plurality of cutting torches supported on said rails in spaced relationship on said carriage projection, and means interconnecting said torches and said tracing mechanism for movement in unison along said rails, said torches being independently adjustable horizontally along said rails with respect to said tracing mechanism and vertically with respect to said tracing mechanism.

17. In a cutting machine, the combination comprising a pair of horizontal parallel tracks, a carriage spanned across said tracks and having a cantilever projection beyond one of said tracks, said carriage being supported on said latter track for movement therealong, and having a pair of rollers on the upper and lower sides of the other track, a pair of superposed horizontal rails carried by said carriage substantially at right angles to said tracks, a frame structure interconnecting said rails into a rigid unit, a plurality of cutting torches supported in spaced relationship on the portion of the upper rail which extends along said carriage projection, and having riding engagement with both of said rails, and a rack bar interconnecting said torches and said tracing mechanism for movement in unison along said rails, said torches being independently adjustable horizontally along said rails with respect to said tracing mechanism and vertically independently of said tracing mechanism.

18. In a cutting machine, the combination comprising a pair of horizontal parallel tracks, a carriage spanned across said tracks and movable therealong, said carriage having a cantilever projection beyond one of said tracks, a pair of vertically spaced rails carried by said carriage substantially at right angles to said tracks, a bar parallel to said rails and movable endwise of said carriage, a tracing mechanism supported on said rails between said tracks and secured to said bar, a plurality of cutting torches supported in spaced relationship on the portion of said rails extending along said carriage projection, releasable means securing each of said torches to said bar in selective position along said bar, and manually controlled motor-driven means for vertically spacing each of said torches in selective position with respect to the workpiece independently of each other and independently of said tracing device.

19. In a torch cutting machine, the combination comprising a carriage, a torch supported on said carriage, a motor forming a unit with said torch, means operable upon rotation of said motor for raising said torch, manually controlled switch means for shutting off said motor when said torch has been elevated to a selected position, and limit switch means for automatically shutting off said motor when said torch is elevated to a predetermined position.

20. In a torch cutting machine, the combination comprising a carriage, a torch carrier unit supported on said carriage for movement therewith and therealong, a vertically slidable member on said unit, a torch secured to said member, a lead screw on said carrier for moving said member and torch vertically, a reversible motor on said carrier for rotating said lead screw, and limit switch means for shutting off current to said motor when said slide reaches either one of its limiting positions.

21. In a torch cutting machine, the combination comprising a carriage, a torch carrier supported on said carriage, means for lifting said carrier, and including a motor, and a plurality of switch means for controlling the operation of said motor, and means whereby simultaneous operation of said switch means will effect operation of said motor only in accordance with the operation of a predetermined one of said switch means, while the other switch means remains ineffective.

22. A cutting machine having a pair of rails disposed in substantially the same horizontal plane, one rail facing downwardly and the other facing upwardly, a carriage movable along said rails and having cantilever projection beyond said last mentioned rail, a pair of horizontal rails vertically spaced in substantially the same vertical plane and which is at right angles to the plane of said first mentioned rails, a bar extending lengthwise and between said second mentioned rails, a torch carrier on said cantilever projection, a tracing unit between said first mentioned rails, both said torch carrier and said tracing unit being movable along said second mentioned rails and connected to said bar, said carrier being supported solely by the upper one of said second mentioned rails and held against tilting movement by the lower rail, and means for adjusting said torch along said bar.

23. A cutting machine having a pair of rails disposed in substantially the same horizontal plane, a carriage movable along said rails and having a pair of horizontal rails vertically spaced in substantially the same vertical plane and which is at right angles to the plane of said first mentioned rails, a rack bar extending lengthwise and between said second mentioned rails, a torch carrier and a tracing unit supported by and movable along said second mentioned rails, means for connecting said tracing unit to said rack bar, a pinion on said torch carrier and engaging said rack bar, and friction means also carried by said torch carrier and engaging said rack bar whereby said torch carrier may be adjusted along said bar by rotation of said pinion and against the action of said friction means.

24. A cutting machine including a carriage supported on rails and having a pair of vertically spaced horizontal rails extending in a direction at right angles to the direction of movement of said carriage, a cutting torch carrier mounted on said last mentioned rails, a unit also mounted on said last mentioned rails for driving said carriage along its rails and said torch support along said second mentioned rails, a rack bar connected to said unit and movable endwise in a direction parallel to and between said second mentioned rails, a friction clutch member carried by said torch carrier and engaging said bar to effect movement of said torch carrier with said bar, and a pinion on said torch carrier and meshing with said rack bar for adjustably moving said torch carrier in respect to said bar and against the action of said clutch.

25. A cutting machine including a carriage, a tracing device, and a cutting torch carrier independently mounted on said carriage and movable along the latter, a rack bar connected to said tracing device and slidable endwise on said carriage in a direction at right angles to the movement of the latter, frictional means normally preventing relative movement of said torch carrier along said bar, and a manually operable member associated with said torch carrier for adjusting the position of said torch carrier along said bar and against the action of said frictional means.

ALFRED F. CHOUINARD.